United States Patent
Ayers

(10) Patent No.: US 10,081,022 B2
(45) Date of Patent: Sep. 25, 2018

(54) DIE MOUNTED CONTACT APPLICATOR

(71) Applicant: Illinois Tool Works Inc., Glenview, IL (US)

(72) Inventor: Andrew S. Ayers, Hendersonville, TN (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 15/265,560

(22) Filed: Sep. 14, 2016

(65) Prior Publication Data

US 2017/0072411 A1    Mar. 16, 2017
US 2018/0117602 A9    May 3, 2018

Related U.S. Application Data

(60) Provisional application No. 62/218,939, filed on Sep. 15, 2015.

(51) Int. Cl.
| | |
|---|---|
| *B05B 1/04* | (2006.01) |
| *B29C 47/14* | (2006.01) |
| *B29C 65/52* | (2006.01) |
| *B29C 47/08* | (2006.01) |
| *B05C 5/02* | (2006.01) |

(Continued)

(52) U.S. Cl.
CPC .............. *B05B 1/044* (2013.01); *B05C 5/001* (2013.01); *B05C 5/0254* (2013.01); *B29C 47/085* (2013.01); *B29C 47/0822* (2013.01); *B29C 47/14* (2013.01); *B29C 47/145* (2013.01); *B29C 65/525* (2013.01); *B29C 47/0007* (2013.01); *B29C 47/025* (2013.01); *B29C 47/0811* (2013.01); *B29C 47/80* (2013.01); *B29C 47/807* (2013.01); *B29C 65/4815* (2013.01)

(58) Field of Classification Search
CPC ....... B05B 1/044; B29C 47/14; B29C 47/085; B29C 47/0822; B29C 47/025; B29C 65/4815; B29C 47/0007; B29C 47/06; B29C 47/068; B29C 47/0811; B29C 47/145; B29C 47/56; B29C 47/80; B29C 47/807; B29C 65/525; B29C 66/91423; B05C 11/1042; B05C 5/0258; B05C 5/027; B05C 9/06; B05C 5/0254; B05C 5/001
USPC ................ 118/300, 302, 313, 411, 412, 429; 239/549, 597, 600, 569; 427/286; 137/884; 222/146.2, 146.5; 425/133.5
See application file for complete search history.

(56) References Cited

U.S. PATENT DOCUMENTS

| | | | |
|---|---|---|---|
| 4,735,169 A | 4/1988 | Cawston et al. | |
| 7,152,815 B2* | 12/2006 | Harris | ................... B05C 5/0258 239/10 |
| 2008/0245298 A1 | 10/2008 | Ayers | |

OTHER PUBLICATIONS

International Search Report issued by ISA/EPO in connection with PCT/US2016/051918 dated Mar. 21, 2017.

(Continued)

*Primary Examiner* — Laura E Edwards
(74) *Attorney, Agent, or Firm* — Levenfeld Pearlstein, LLC

(57) ABSTRACT

A slot die assembly for applying at least one material onto a substrate includes an adapter having a passive heat transfer device, a shim package fluidically connected to the adapter, the shim package having a first material discharge slot and a second material discharge slot, and a die plate having a one or more fluid channels fluidically connected to the shim package. The assembly also includes one or more mounting studs extending from the adapter, the mounting studs configured to engage a parent machine.

12 Claims, 6 Drawing Sheets

(51) Int. Cl.
*B05C 5/00* (2006.01)
*B29C 47/80* (2006.01)
*B29C 65/48* (2006.01)
*B29C 47/00* (2006.01)
*B29C 47/02* (2006.01)

(56) References Cited

OTHER PUBLICATIONS

International Preliminary Report on Patentability issued by ISA/EPO in connection with PCT/US2016/051918 dated Mar. 29, 2018.

* cited by examiner

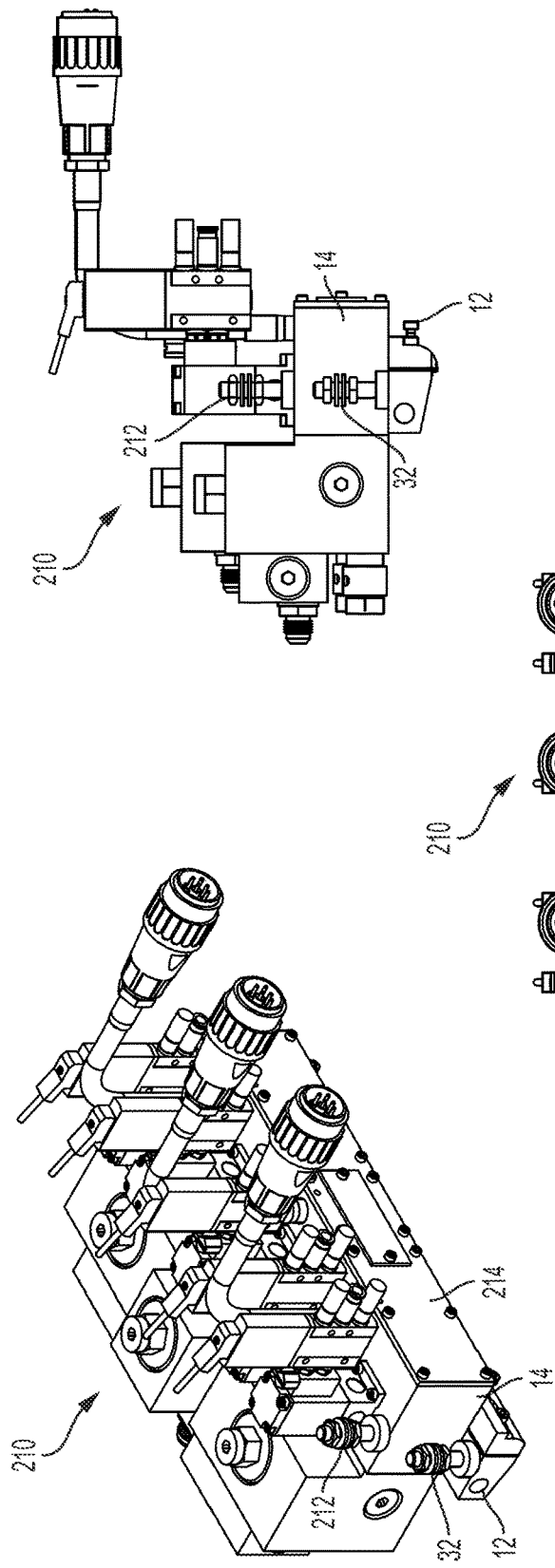
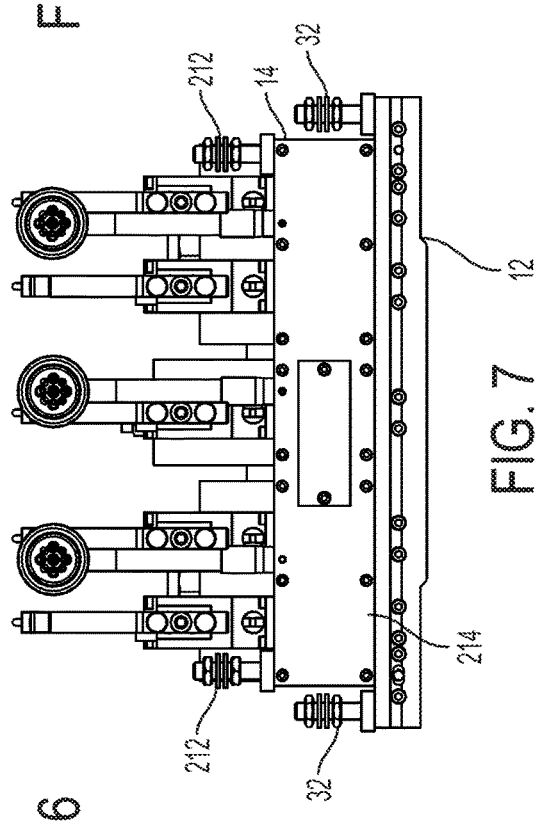
FIG. 6
FIG. 7
FIG. 8

DIE MOUNTED CONTACT APPLICATOR

BACKGROUND

Adhesive hot melt systems may include an applicator for applying a hot melt adhesive onto a substrate. One type of applicator includes a slot die assembly for extruding and discharging a material onto the substrate. The slot die assembly typically includes an adapter, a shim and a die plate secured together.

Conventional slot die assemblies are secured to an adjacent applicator component, which, in turn may be secured to a parent machine. That is, a conventional slot die assembly may be secured directly to an adjacent applicator component. The adjacent applicator component is then secured to the parent machine. Thus, the conventional slot die assembly is secured to the parent machine by way of the adjacent applicator component. In some configurations, the adjacent applicator component is secured to one or more other components which are then secured to the parent machine. This series of components, i.e., the slot die assembly and one or more applicator components secured together, may be referred to as a "stack" of components. The stack extends generally in a vertical or height direction. Each connection or interface in the stack includes a tolerance in the vertical or height direction. When assembled, the tolerances are cumulative throughout the stack. The conventional slot die assembly and the adjacent applicator component are formed with the same width as well, and are aligned at their respective lateral ends.

Because of the multiple connections and tolerances, it is also difficult to align the lateral ends of the slot die assembly. Further, it is difficult to assemble a stack having suitably low tolerances in the height direction. Thus, conventional assemblies often include complicated and expensive mounting adapters or adjusters. After installing the slot die assembly and other applicator components on the machine, the mounting adapters or adjusters must be carefully operated until the lateral ends of the slot die assembly are aligned and to position the slot die assembly parallel to a surface or path onto which the material is to be applied. The process of securing individual components together and then adjusting the components to account for variances in position is labor intensive and time consuming. The equipment required to adjust or tune the position of the slot die assembly is expensive as well.

Accordingly, it is desirable to provide a slot die assembly with a mounting structure to allow for the slot die assembly to be mounted directly to the parent machine, thereby providing a stack tolerance in the height direction, for example, not exceeding +/−0.002 inches, without additional equipment for tuning of the position of the slot die assembly after installation of the stack.

SUMMARY

According to one aspect, there is provided a slot die assembly for applying at least one material onto a substrate. The assembly includes an adapter having a passive heat transfer device, a shim package fluidically connected to the adapter, the shim package having a first material discharge slot and a second material discharge slot, and a die plate having a one or more fluid channels fluidically connected to the shim package. The assembly also includes one or more mounting studs extending from the adapter, the mounting studs configured to engage a parent machine.

According to another aspect, there is provided an applicator for applying at least one material onto a substrate. The applicator includes one or more applicator components having a combined first width and a slot die assembly secured to the one or more applicator components. The slot die assembly has a second width greater than the first width so as to extend beyond the ends of the applicator components. The slot die assembly also includes one or more mounting studs between which the applicator components are positioned. The one or more mounting studs are configured to engage a parent machine to secure the slot die assembly and the applicator components to the parent machine.

According to another aspect, there is provided an applicator assembly for applying at least one material onto a substrate. The applicator assembly includes a parent machine, one or more applicator components having a combined first width and a slot die assembly secured to the one or more applicator components, the slot die assembly having a second width greater than the first width so as to extend beyond lateral ends of the applicator components. The slot die assembly includes one or more mounting studs between which the applicator components are positioned. The one or more mounting studs are disposed in fastening engagement with the parent machine to secure the slot die assembly and the applicator components to the parent machine.

Other objects, features, and advantages of the disclosure will be apparent from the following description, taken in conjunction with the accompanying sheets of drawings, wherein like numerals refer to like parts, elements, components, steps, and processes.

BRIEF DESCRIPTION OF THE DRAWINGS

FIG. 6 is perspective view of an applicator according to another embodiment described herein;

FIG. 7 is a front view of the adapter of FIG. 6;

FIG. 8 is a side view of the applicator of FIG. 6;

DETAILED DESCRIPTION

Figure 1:
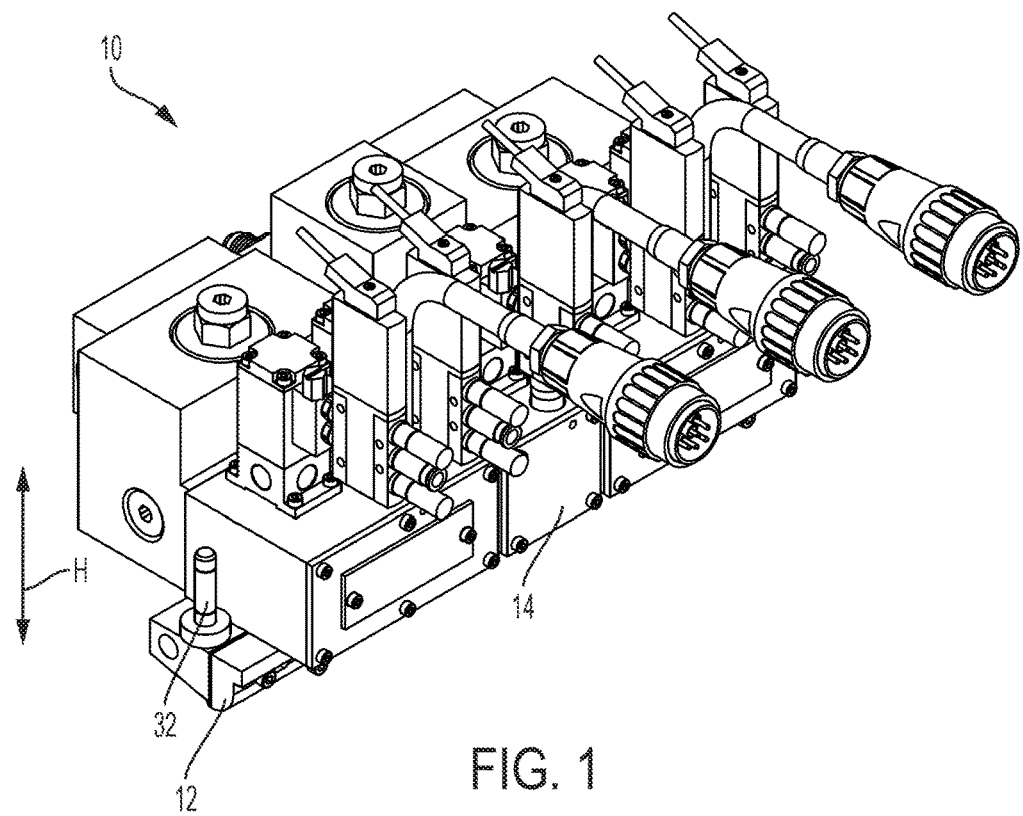
FIG. 1 is a perspective view of an applicator having a slot die assembly according to an embodiment described herein.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Figure 2:
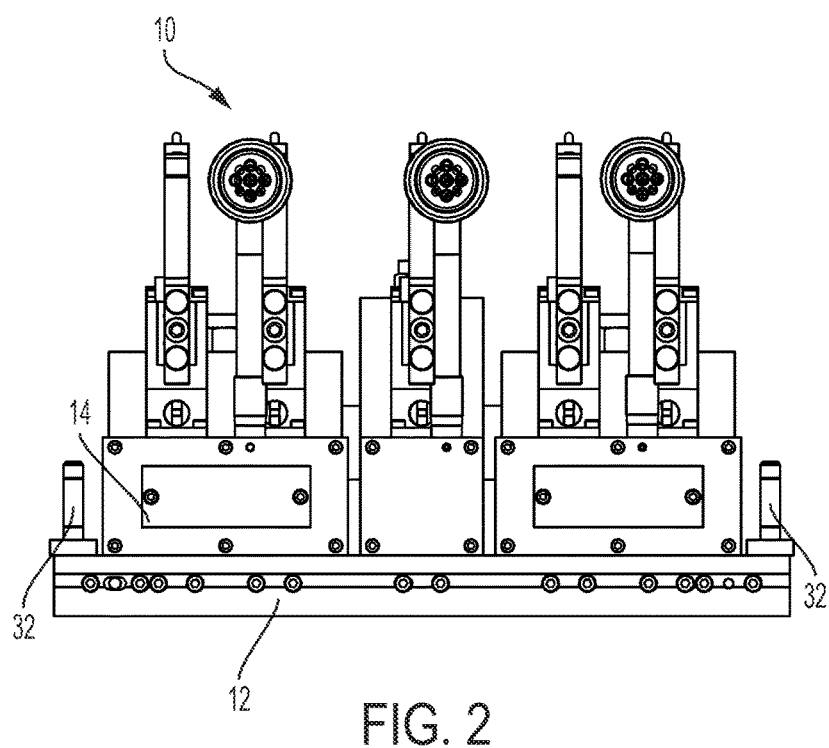
FIG. 2 is a front view of the applicator and slot die assembly of FIG. 1.

FIGS. 1 and 2 are perspective and front views, respectively, of an applicator 10 having a slot die assembly 12 and one or more adjacent applicator components 14, according to an embodiment described herein. Referring to FIGS. 1 and 2, the slot die assembly 12 described herein may be used with the hot melt adhesive applicator 10. The slot die assembly 12 may be secured to and disposed in fluid communication with the adjacent applicator component 14. The adjacent applicator component may be, for example, a valve manifold or service block. In one embodiment, the adjacent applicator component may include a plurality of service blocks connected to and disposed in fluid communication with the slot die assembly 12.

Figure 10:
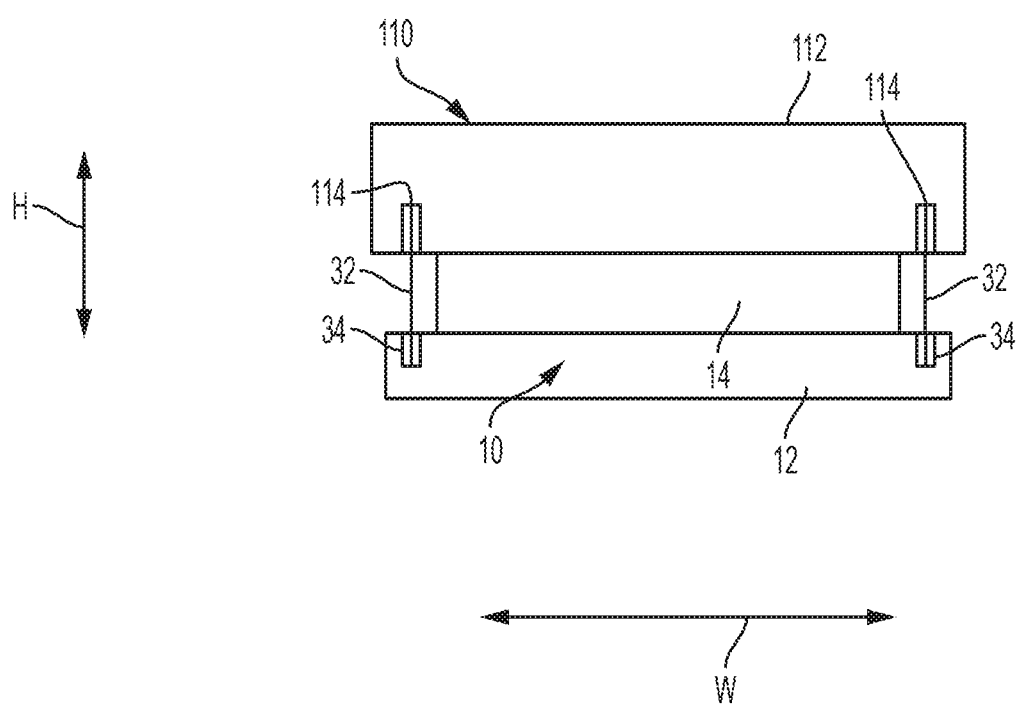
FIG. 10 is a diagram showing an applicator secured to a parent machine in an applicator assembly according to an embodiment described herein.

FIG. 10 is a diagram showing an applicator assembly 110 with the applicator 10 secured to a parent machine 112. Referring to FIG. 10, the slot die assembly 12 may be secured directly to the parent machine 112 as discussed further below.

Figure 3:
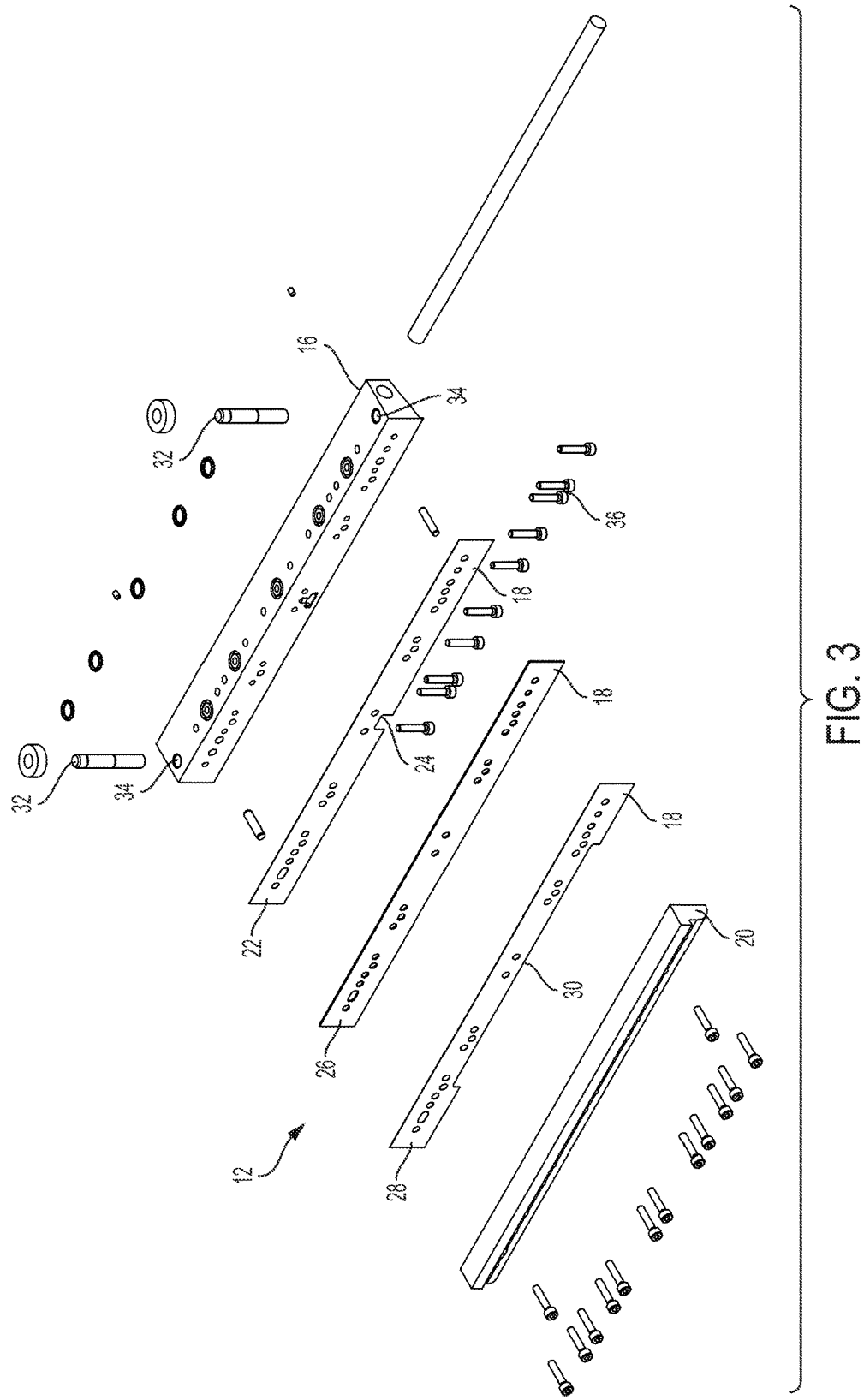
FIG. 3 is an exploded view of the slot die assembly according to an embodiment described herein.
Figure 5:
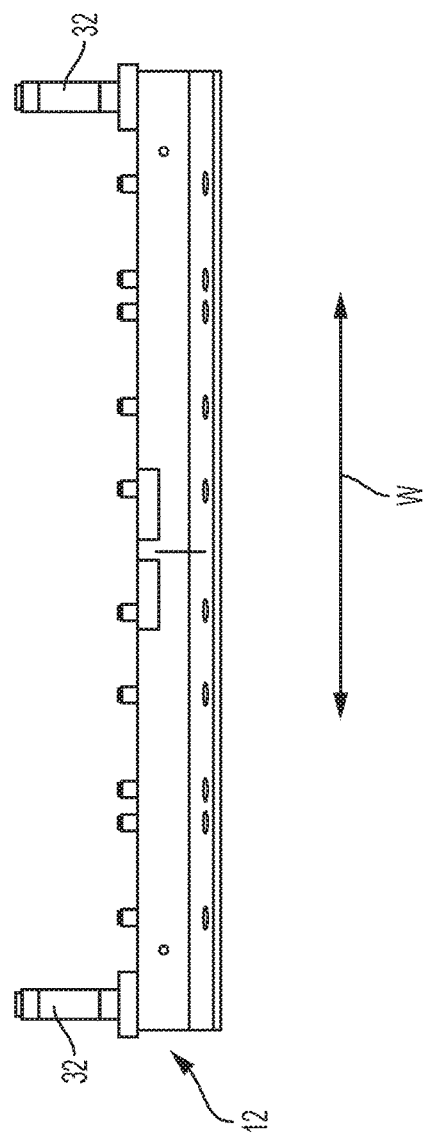
FIG. 5 is a front view of the slot die assembly of FIG. 3.
Figure 4:
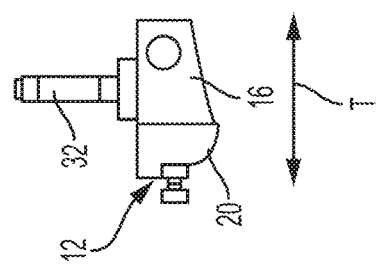
FIG. 4 is a side view of the slot die assembly of FIG. 3.

FIG. 3 is an exploded view of the slot die assembly 12 of FIG. 1, FIG. 4 is a side view of the slot die assembly 12 of FIG. 1, and FIG. 5 is a front view of the slot die assembly 12 of FIG. 1. Referring to FIGS. 3-5, in one embodiment, the slot die assembly 12 generally includes an adapter 16, a shim package 18 and a die plate 20. The slot die assembly 12 is configured to receive one or more materials, direct the materials(s) through an internal flow path, and discharge the material(s) through one or more shim plates of a shim package 18, for application onto a substrate. In one embodiment, the one or more materials may be an adhesive, such as a hot melt adhesive, or first and second adhesives, including hot melt adhesives.

In one embodiment, for example, as shown in FIG. 3, the slot die assembly 12 may be a dual pattern shim assembly configured to receive first and second materials and discharge the first and second materials from different individual shim plates of the shim package 18. For example, a first material may be received in the adapter 16 and directed to a first shim plate 22 of the shim package 18 for discharge from a first slot 24 formed in the first shim plate 22. The second material may be received in the adapter 16 and directed through the first shim plate 22, a second shim plate 26 and a third shim plate 28 into the die plate 20. The second material may then be directed back to the third shim plate 28 for discharge from a second slot 30 formed in the third shim plate 28.

The present disclosure is not limited to the example described above and shown in FIG. 3, and other slot die assemblies having an adapter, shim plates and a die plate are also envisioned. For example, a single pattern shim assembly, or other dual pattern shim assemblies are also envisioned, such as those described in U.S. Pat. App. Pub. No. 2008/0245298, to Ayers, having a common assignee with the present application, and which is incorporated herein by reference in its entirety. In addition, slot die assemblies having additional or fewer than three shim plates are envisioned. For example, slot die assemblies having one or more shim plates are envisioned. Further, a slot die assembly formed as an extrusion die or segmented die, as well as slot die assemblies having only an adapter and die plate secured together are envisioned as well. In one embodiment, the slot die assembly 12 is a contact type die used in a contact die applicator.

With further reference to FIGS. 1-5, in one embodiment, the slot die assembly 12 includes one or more mounting studs 32. The mounting studs 32 may be positioned in corresponding mounting bores 34 of the slot die assembly 12, for example, within the adapter 16. The mounting studs 32 are disposed at positions proximate to the lateral ends of the slot die assembly 12. The mounting studs 32 extend from the slot die assembly 12 and are configured to engage the parent machine 112 (see FIG. 10) to secure the slot die assembly 12 to the parent machine 112. The mounting studs 32 may be threaded fasteners, such as bolts and the like. It is understood, however, that other similar, suitable fastening devices may be used. The mounting studs 32 may be configured for removable fastening engagement with the parent machine 112. Accordingly, suitable access may be provided to the mounting studs 32, for example, through the slot die assembly 12 or parent machine 112 to manipulate the mounting studs 32 for securing and releasing engagement.

Referring to FIGS. 1, 2 and 5, the slot die assembly 12 of the present application is formed with a width, i.e., extends in the width direction 'W,' greater than that of the adjacent applicator component 14. In one embodiment, mounting studs 32 are positioned generally proximate to lateral ends of the slot die assembly 12, at portions of the slot die assembly 12 extending laterally beyond the adjacent applicator component 14. Accordingly, the slot die assembly 12 may be secured to the adjacent applicator component 14 with one set of fasteners (e.g., first fasteners 36), while the mounting studs 32 may be secured directly in corresponding bores 114 (see FIG. 10) of the parent machine 112. Thus, in one embodiment, the adjacent applicator component 14 may be secured to the parent machine 112 by way of the connection to the slot die assembly 12, and in turn, through the connection of the mounting studs 32 to the parent machine 112.

The corresponding bores 114 of the parent machine 112 are precision machined, and in one embodiment, have a tolerance of less than or about +/−0.002 inches (in) in the height direction 'H' when coupled with the mounting studs 32. In this configuration, tolerances in the height direction 'H' need only be accounted for at the connection of the mounting studs 32 to the parent machine 112 in the precision machined bores 114 of the parent machine 112, rather than at an interface of each component in a stack. In addition, the precision machined bores 114 of the parent machine 112 may allow for quick, proper alignment in the width direction 'W' when installing the slot die assembly, because the mounting studs 32 align with the corresponding bores 114 in the width direction 'W.'.

In the embodiments above, a slot die assembly 12 may be quickly installed and properly aligned within desirable tolerances (for example, within +/−0.002 in) by directly connecting the mounting studs 32 to the corresponding bores 114 of the parent machine 112. This configuration avoids an accumulation of tolerances between a stack of components found in conventional assemblies. Thus, post installation adjustments, tuning, repositioning and the like of the slot die assembly 12 may be substantially reduced or avoided, thereby reducing installation time and down time of the assembly.

However, the present disclosure is not limited to the examples above, and other configurations are envisioned. For example, FIGS. 6-9 illustrate examples of another configuration where the adjacent applicator component 14 may also be secured to the parent machine 112 using a secondary fastening mechanism 212. In such an embodiment, the slot die assembly 12 may be installed and removed from the applicator 210 while the adjacent applicator component 14 remains attached to the parent machine 112 by way of the secondary fastening mechanism 212. Accordingly, the slot die assembly 12 may be removed or installed without handling of the adjacent applicator component 14, which may be at a high or increased temperature after use.

The embodiment illustrated in FIGS. 6-9 includes features that are similar or identical those shown in FIGS. 1-5 and described above. Further description of these features may be omitted below. In addition, features in the embodiment shown in FIG. 6-9 that are similar or identical to features shown in FIGS. 1-5 and described above may be referred to with the same terminology and/or the same reference numbers as above. Further still, it is understood that various features from the different embodiments described herein may be combined, used with, or replace features in other embodiments.

Figure 9:
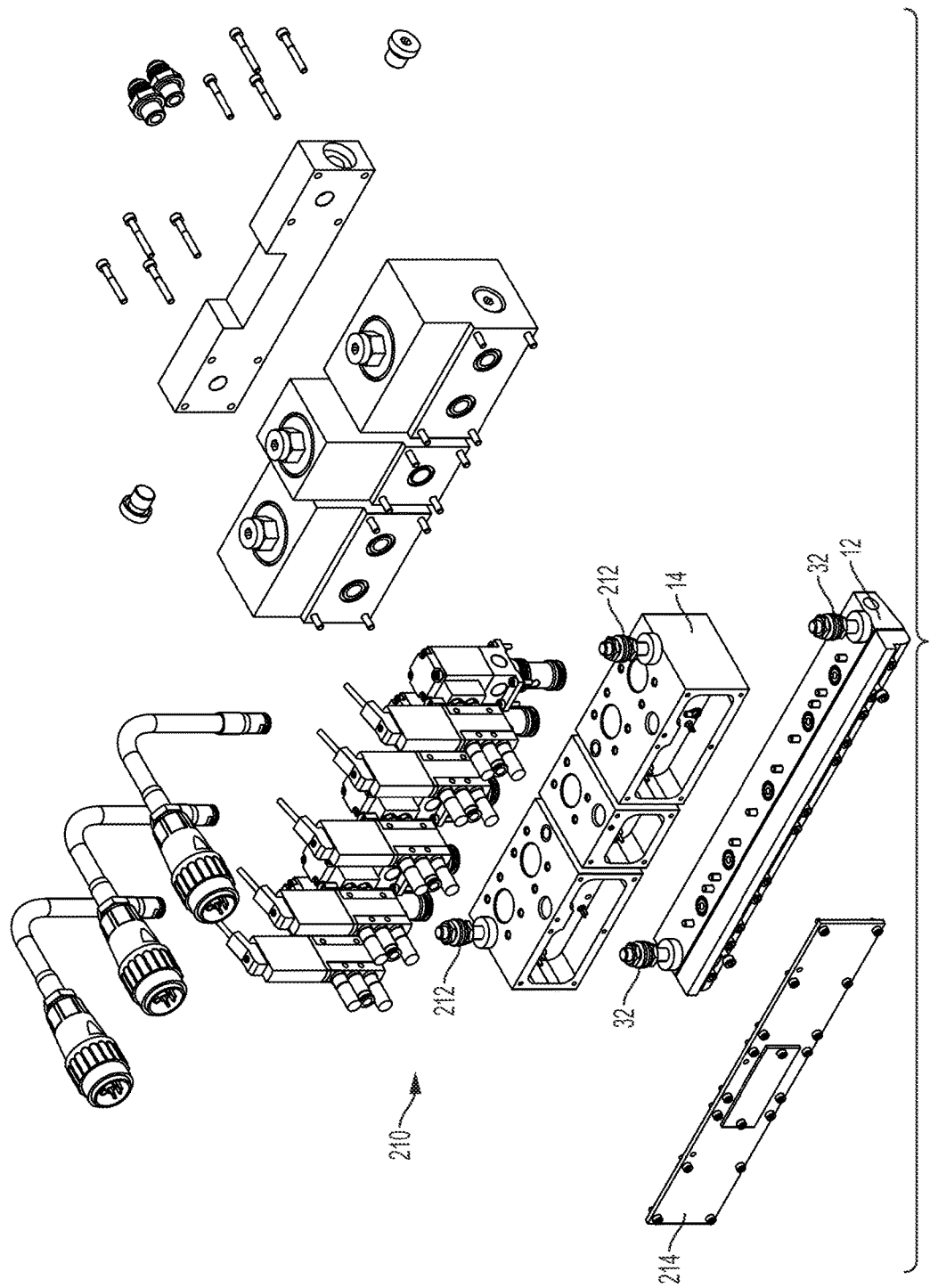
FIG. 9 is an exploded view of the applicator of FIG. 6.

FIG. 6 is a perspective view of an applicator 210 according to another embodiment described herein. FIG. 7 is a front view of the applicator 210 of FIG. 6 and FIG. 8 is a side view of the applicator 210 of FIG. 6. FIG. 9 is an exploded view of the applicator 210 of FIG. 6. The applicator 210 of FIGS. 6-9 may be used together with the parent machine 112 described above and shown in FIG. 10, as part of the applicator assembly 110.

With reference to FIGS. 6-9, the applicator 210 includes the slot die assembly 12 and the adjacent applicator component 14, such as one or more valve manifolds or service blocks. The slot die assembly 12 is secured to and disposed in fluid communication with the adjacent applicator component 14. The applicator 210 may also include the second fastening mechanism 212. In one embodiment, the secondary fastening mechanism 212 includes one or more fasteners extending from the adjacent applicator component 14 configured for receipt in or securing engagement with the parent machine 112, such that the adjacent applicator component 14 may be independently supported on the parent machine 112. The fasteners 212 may be, for example, two or more spaced part threaded fasteners or the like secured to the adjacent applicator component 14 and extending outwardly therefrom for engagement with the parent machine 112. The fasteners 212 may be configured for releasable engagement with one of or both of the adjacent applicator component 14 and the parent machine 112. The adjacent applicator component 14 may further include a cover plate 214 configured to provide additional stiffness or rigidity to the adjacent applicator component 14.

In one embodiment, the second fastener mechanism 212 and the corresponding engagement with the parent machine 112 need not be formed within the tolerances of the mounting studs 32 of the slot die assembly 12 and the parent machine 112. For example, the adjacent applicator component 14 may be secured to the parent machine 112 by way of the secondary fastening mechanism 212. The slot die assembly 12 may then be secured directly to the parent machine 112 with the mounting studs 32. The fastening engagement between the mounting studs 32 and the precision machined corresponding bores 114 of the parent machine 112 adjusts and positions the applicator 210 (i.e., the slot die assembly 12 and adjacent applicator component 14) within the desired tolerances, for example, +/−0.002 in.

Accordingly, in the embodiment shown in FIG. 6-9 and described above, the slot die assembly 12 may be independently secured to and removed from the parent machine 112 while the adjacent applicator component 14 remains supported on the parent machine 112. Thus, handling of the adjacent applicator component 14 may be reduced or limited when changing out or replacing the slot die assembly 12.

Referring again to FIG. 3, in some embodiments, the slot die assembly 12 may also include a passive heat transfer device 38, such as an isobar. The passive heat transfer device 38 may be disposed within a lateral bore 40 of the slot die assembly 12, for example, within the adapter 16. The passive heat transfer device 38 is configured to evenly distribute heat across the slot die assembly 12. Evenly distributed heat across the slot die assembly 12 may allow for an even flow of material through the die assembly 12. For example, by way of the passive heat transfer device 38, a substantially evenly heated slot die assembly 12 may reduce or eliminate lower temperatures zones within the die assembly 12. Lower temperature zones may undesirably increase viscosity of a material flowing in the slot die assembly, which, in turn, could disrupt or block discharge of the material from the slot die assembly 12. Thus, by providing evenly distributed heat across the slot die assembly 12, for example, with the passive heat transfer device 38, an even flow of material through the slot die assembly 12 may be promoted. The passive heat transfer device 38 may be made of a thermally conductive metal or other material different from the material from which the adapter 16 is made. Preferably, the passive heat transfer device 38 has a higher thermal conductivity than the adapter 16.

In the embodiments above, by mounting the stack directly to the parent machine, by way of the mounting studs 32 of the slot die assembly 12, a cumulative or aggregated tolerance of the stack relative to the parent machine 112 in the height direction 'H,' may be reduced compared to conventional stack assemblies. Mounting of the slot die assembly 12, and in turn, the stack, directly to the parent machine 112 is accommodated by forming the slot die assembly 12 with a width greater than that of the adjacent applicator component 14 so that the slot die assembly 12 extends laterally beyond the adjacent applicator component 14.

Thus, in contrast to conventional slot die assemblies, the slot die assembly 12 described in the embodiments above may be secured directly to the parent machine 112 via the mounting studs 32. Accordingly, the tolerance at this connection, i.e., between the mounting studs 32 and the parent machine 112, may be closely controlled, for example, to not exceed +/−0.002 inches. In some embodiments, this tolerance may be made even smaller. Accordingly, the stack may be assembled by securing the mounting studs 32 to the parent machine, without additional tuning. In other embodiments, the adapter 16 and mounting studs 32 may be formed having specific predetermined tolerances for desired applications.

Additionally, the adapter 16 may be formed with an increased thickness compared to known adapters in order to accommodate the passive heat transfer device 38 for promoting an even temperature distribution in the adapter 16. The passive heat transfer device 38 may extend along a portion or an entirety of the width of the adapter 16 to distribute heat to the outer extents of the slot die assembly 12 extending beyond the adjacent applicator component 14. The passive heating device 38 may thus limit or prevent cooling of the outer extents, and turn, limit or prevent cooling of the material or adhesive in these extents. As such, a viscosity of the material may be maintained at a desired or optimal level to promote flow of the material through the slot die assembly 12.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A slot die assembly for applying at least one material onto a substrate, the slot die assembly comprising:
   an adapter having a passive heat transfer device disposed therein and configured to receive the at least one material;
   a shim package having a first shim plate, a second shim plate and a third shim plate fluidically connected to the adapter and configured to receive the at least one material from the adapter, the first shim plate having a first slot for discharging a first material of the at least one material and the third shim plate having a second slot for discharging a second material of the at least one material;
   a die plate having a one or more fluid channels fluidically connected to the shim package;
   one or more mounting studs extending from the adapter to a first height, the mounting studs configured to engage a parent machine; and
   one or more first fasteners configured to engage an applicator component, the first fasteners extending from the adapter to a second height, wherein the second height is less than the first height.

2. The slot die assembly of claim 1, wherein a first path extends in the adapter and is configured to deliver the first material to the first slot for discharging the first material.

3. The slot die assembly of claim 2, wherein a second path extends in the adapter, the shim package and the die plate and is configured to deliver the second material to the second slot for discharging the second material, the second path including the one or more fluid channels of the die plate.

4. The slot die assembly of claim 1, wherein the second shim plate is positioned between and spaces apart the first shim plate from the third shim plate.

5. The slot die assembly of claim 1, wherein the adapter has a width of approximately 300 mm.

6. An applicator for applying at least one material onto a substrate, the applicator comprising:
   one or more applicator components having a combined first width, the one or more applicator components including at least one of a service block and a valve manifold; and
   a slot die assembly secured to the one or more applicator components, the slot die assembly having a second width greater than the first width so as to extend beyond lateral ends of the one or more applicator components, the slot die assembly further comprising two mounting studs spaced apart along the width of the slot die assembly, and the one or more applicator components are positioned between the two mounting studs,
   wherein the mounting studs are configured to engage a parent machine to secure the slot die assembly and the one or more applicator components to the parent machine, and
   wherein the slot die assembly is configured to receive the at least one material and comprises a discharge slot for discharging the at least one material.

7. The applicator of claim 6, wherein the slot die assembly includes an adapter, a shim package and a die plate, wherein the shim package includes one or more shim plate and the discharge slot is formed in a shim plate of the one or more shim plates.

8. The applicator of claim 7, wherein the adapter includes a passive heat transfer device disposed therein.

9. The applicator of claim 8, wherein the passive heat transfer device is made from a material having a higher thermal conductivity than the adapter.

10. The applicator of claim 6, wherein the one or more applicator components further include a secondary fastening mechanism including one or more fasteners configured to engage the parent machine.

11. An applicator assembly for applying at least one material onto a substrate, the applicator assembly comprising:
    a parent machine having one or more bores;
    one or more applicator components having a combined first width, the one or more applicator components including at least one of a service block and a valve manifold; and
    a slot die assembly secured to the one or more applicator components, the slot die assembly having a second width greater than the first width so as to extend beyond lateral ends of the one or more applicator components, the slot die assembly further comprising two mounting studs spaced apart along the width of the slot die assembly, and the one or more applicator components are positioned between the two mounting studs,
    wherein the mounting studs are disposed in fastening engagement with the one or more bores, respectively, of the parent machine to secure the slot die assembly and the one or more applicator components to the parent machine, and
    wherein the slot die assembly includes an adapter, a shim package and a die plate, and is configured to receive the at least one material, direct the at least one material through an internal flow path and discharge the at least one material through one or more shim plates of the shim package.

12. The applicator assembly of claim 11, wherein the one or more applicator components further include a secondary fastening mechanism including one or more fasteners for engaging the parent machine.

* * * * *